United States Patent [19]

Uramoto

[11] Patent Number: 4,779,219
[45] Date of Patent: Oct. 18, 1988

[54] ELECTRONIC APPARATUS HAVING AN IMPROVED CALCULATION FUNCTION

[75] Inventor: Yuji Uramoto, Tokyo, Japan

[73] Assignee: Canon Kabushiki Kaisha, Tokyo, Japan

[21] Appl. No.: 860,024

[22] Filed: May 6, 1986

[30] Foreign Application Priority Data

May 16, 1985 [JP] Japan ................. 60-102701

[51] Int. Cl.$^4$ .............................. G06F 7/52
[52] U.S. Cl. ................................... 364/744
[58] Field of Search ................. 364/744, 709

[56] References Cited

U.S. PATENT DOCUMENTS

| | | | |
|---|---|---|---|
| 3,575,590 | 4/1971 | Crowther et al. | 364/744 |
| 3,634,666 | 1/1972 | Ragen | 364/744 |
| 4,092,523 | 5/1978 | Tava et al. | 235/310 |
| 4,156,921 | 5/1979 | Wenninger et al. | 364/744 |
| 4,189,780 | 2/1980 | Figini | 364/744 |

*Primary Examiner*—David H. Malzahn
*Attorney, Agent, or Firm*—Fitzpatrick, Cella, Harper and Scinto

[57] ABSTRACT

In an electronic apparatus performing various calculations based on input data which are entered by pressing numeral keys and calculation keys and outputting results by moving a decimal point by a predetermined digit, there is provided means for judging, when a calculation result output key is operated, the presence or absence of a flag designating either a division calculation or a multiplication calculation and judging the calculation mode. Only when the calculation condition at the time when the calculation result output key is operated is at a first registration number state and the division flag is set, the calculation result is output by moving the decimal point by a predetermined digit. If the multiplication flag is set, the calculation result is output without moving the decimal point. With such an arrangement, in a so-called add-mode performing calculations and outputting calculated results by automatically moving decimal points, a function of performing a division by an identical number and moving the decimal point and a function of performing a multiplication by an identical number and not moving the decimal point, are realized.

15 Claims, 3 Drawing Sheets

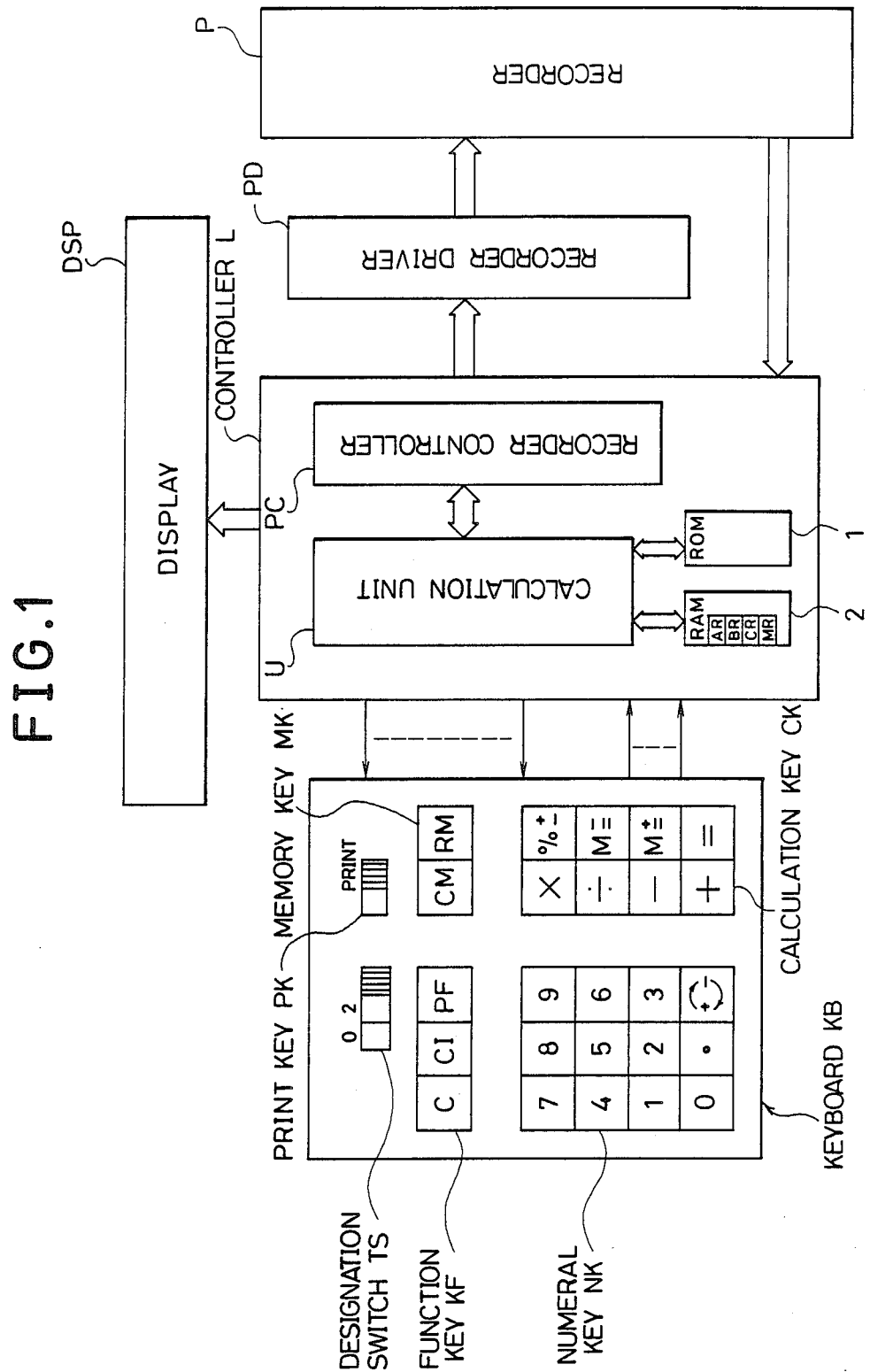

FIG.3

| No | KEY OPERATION | DISPLAY | RECORD |
|---|---|---|---|
| T1 | 1 2 3 | 1 2 3. | |
| T2 | + | 1 . 2 3 | 1 . 2 3 + |
| T3 | C | 0. | 0 . C |
| T4 | 1 2 3 | 1 2 3. | |
| T5 | × | 1 . 2 3 | 1 . 2 3 × |
| T6 | 4 | 4. | |
| T7 | = | 4 . 9 2 | 4 . =<br>4 . 9 2 |
| T8 | 5 = | 6 . 1 5 | 5 . =<br>6 . 1 5 |
| T9 | 1 2 3 ÷ | 1 . 2 3 | 1 . 2 3 ÷ |
| T10 | 2 = | 0 . 6 2 | 2 . =<br>0 . 6 2 |
| T11 | 2 3 4 = | 1 . 1 7 | 2 . 3 4 =<br>1 . 1 7 |

ELECTRONIC APPARATUS HAVING AN IMPROVED CALCULATION FUNCTION

BACKGROUND OF THE INVENTION

1. Field of the Invention

The present invention relates to an electronic apparatus and more particularly, to an electronic apparatus performing various calculations based on input data and outputting results by moving the decimal point by a predetermined digit.

2. Related Background Art

Various specific calculation and output modes are employed for a known electronic desk type calculator (hereinafter referred to as electronic calculator) for practical applications. A so-called add-mode automatically moving a decimal point is known, which is particularly useful for calculating with respect to dollars and cents.

When a calculation of the amount of money, including different monetary units such as dollars and cents, is performed, a decimal point is automatically inserted between the different monetary units in the add-mode. The lower two digits of a number including monetary units of dollars and cents are considered as cents and a decimal point is automatically inserted in front of the lower two digits.

For example, in summing 1 dollar and 23 cents with 4 dollars and 56 cents, keys "1", "2", "3", "+", "4", "5", "6" and "=" are pressed in this order. Decimal points are automatically inserted in front of the lower two digits so that "5.79" indicating 5 dollars and 79 cents is output. The operational procedure for this is as shown in Table 1.

TABLE 1

| (Addition in Conventional Add-Mode) | | |
|---|---|---|
| No. | Key Operation | Output |
| 1 | [1] [2] [3] | 1.23 |
| 2 | [+] | 1.23 |
| 3 | [4] [5] [6] | 4.56 |
| 4 | [=] | 5.79 |

By using the add-mode, it is convenient in that decimal points are not needed to be entered by pressing the corresponding key.

The conventional add-mode function is effective for the addition and subtraction operations and it not executed for the multiplication and division operations or, when it is executed, a first registration number (dividend or multiplicand) is divided by 100 (in case of two digits shift) and a second registration number (divisor or multiplier) is subject to calculation without a decimal point shift. The reason for this is that multipliers or divisors used in calculating the amount of money are seldom in term of money amount. For instance, in calculating the sun of money for buying five goods each amounting 1 dollar and 23 cents, keys "1", "2", "3", "x", "5" and "=" are pressed in this order to first move the decimal point of the first registration number by two digits and then perform a calculation using the second registration number without performing a decimal point shift. As a result, "6.15" indicating 6 dollars and 15 cents is output. The operational procedure for this is as shown in Table 2.

TABLE 2

| (Multiplication in Conventional Add-Mode) | | |
|---|---|---|
| No. | Key Operation | Output |
| 1 | [1] [2] [3] | 1.23 |
| 2 | [×] | 1.23 |
| 3 | [5] | 5 |
| 4 | [=] | 6.15 |

In case of division, the similar operations are performed without shifting the decimal point of the second registration number.

However, if the conventional electronic calculator is set at an add-mode and used for identical number calculations, the decimal point shift is not carried out. As is well known, in the identical number calculation, the calculation mode (designated by calculation key) and the second (or first) registration number immediately before the calculation are stored. Thereafter, the first (second) registration number is entered following depression of an equal "=" key functioning as a calculation result output key, to thereby perform addition, subtraction, multiplication or division using identical numbers. For instance, in calculating the amount of money which each one of three persons must pay for a purchase amounting 3 dollars and 69 cents, keys "3", "6", "9", "/", "3" and "=" are pressed in this order to accordingly obtain a solution "1.23". After this calculation, the second registration number, in this case the identical number "3", and the division calculation mode are stored. However, in case where the next identical number calculation for a next purchase, e.g., division of 5 dollars and 64 cents by the identical number "3", is necessary, the conventional electronic calculator cannot perform a decimal point shift in the add-mode. For instance, even if keys "5", "6", "4" and "=" are entered, this input is not considered as an input in the add-mode, but an ordinary calculation of "564/3" is performed and "188.00" is output. The operational procedure for this is as shown in Table 3.

TABLE 3

| (Identical Number Division in Conventional Add-Mode) | | | |
|---|---|---|---|
| No. | Key Operation | Output | Note |
| 1 | [3] [6] [9] | 3.69 | (Add-Mode) |
| 2 | [÷] | 3.69 | |
| 3 | [3] | 3 | (Identical Number) |
| 4 | [=] | 1.23 | |
| 5 | [5] [6] [4] | 564 | |
| 6 | [=] | 188.00 | (÷ Identical Number) |

Therefore, it is necessary to enter the entire keys including the identical number or to divide the calculation result by 100, resulting in a disadvantage of cumbersome operations and of multiple operation procedures.

SUMMARY OF THE INVENTION

It is a first object of the present invention to perform a correct division, in an identical number calculation setting a first registration number of first occurrence at the add-mode and using a second registration as an identical number, by setting a first registration number of second and following occurrences at the add-mode.

It is a second object of the present invention to perform correct division and multiplication, in the similar identical number calculation, by setting a first registration number of second and following occurrences at the add-mode in case of division operation using a second registration number as an identical number, and by not setting a second registration number of second and following occurrences at the add-mode in case of multiplication operation using a first registration number as an identical number.

The above and other objects of the invention will become more apparent from the following description taken in connection with the accompanying drawings in which:

DESCRIPTION OF THE DRAWINGS

FIG. 1 is a block diagram showing the construction of the electronic apparatus according to an embodiment of the present invention;

FIG. 3 shows an example of key operations and outputs with respect to the electronic apparatus of FIG. 1.

DETAILED DESCRIPTION OF THE EMBODIMENT

Figure 2A:
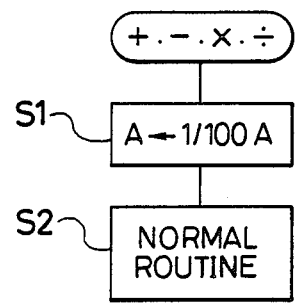
FIGS. 2(A) and 2(B) are flow charts illustrating the control procedures by the calculation unit of FIG. 1.

Correct calculation outputs for the prior art calculation example shown in Table 3 is shown in Table 4.

TABLE 4

(Identical Number Division in Add-Mode of the Invention)

| No. | Key Operation | Output | Note |
|---|---|---|---|
| 1 | 3 6 9 | 3.69 | (add-Mode) |
| 2 | ÷ | 3.69 | |
| 3 | 3 | 3 | (Identical Number) |
| 4 | = | 1.23 | |
| 5 | 5 6 4 | 5.64 | (Add-Mode) |
| 6 | = | 1.88 | (÷ Identical Number) |

According to the prior art, the outputs Nos. 5 and 6 operations in Table 4 are not obtained. In multiplication calculation using the apparatus adapted to obtain the outputs as shown in Table 4, there arises a problem. For example, in a calculation by key operations "1", "2", "3", "x", "4" and "=", which results in a solution "4.92", the multiplication operation mode and the identical number "1.23" or first registration number are stored in case of a multiplication calculation. In this case, if keys "5" and "=" are entered so as to multiply the identical number "1.23" by 5, a calculation of "1.23×0.05" is performed to output a result "0.06". The operational procedure for this is as shown in Table 5.

TABLE 5

(Explanatory Example)

| No. | Key Operation | Output | Note |
|---|---|---|---|
| 1 | 1 2 3 | 1.23 | (Add-Mode Identical Number) |
| 2 | × | 1.23 | |
| 3 | 4 | 4 | |
| 4 | = | 4.92 | |
| 5 | 5 | 0.05 | (Add-Mode) |
| 6 | = | 0.06 | (× Identical Number) |

Therefore, it is necessary to enter the entire keys including the identical number or to multiply the calculation result by 100, resulting in a disadvantage of cumbersome operations and of multiple operation procedures. Correct calculation outputs are shown in Table 6.

TABLE 6

(Identical Number Multiplication in Add-Mode of the Invention)

| No. | Key Operation | Output | Note |
|---|---|---|---|
| 1 | 1 2 3 | 1.23 | (Add-Mode Identical Number) |
| 2 | × | 1.23 | |
| 3 | 4 | 4 | |
| 4 | = | 4.92 | |
| 5 | 5 | 5 | |
| 6 | = | 6.15 | (× Identical Number) |

With the apparatus adapted to obtain the outputs as in Table 6, there arises a problem of division calculation, e.g., the problem as described with Table 3. That it, in performing the identical number calculation by setting the apparatus at the add-mode, the apparatus capable of performing a correct division cannot perform a correct multiplication, or vice versa. Thus, the present invention provides an electronic apparatus capable of performing a correct division as shown in Table 4 and also performing a correct multiplication as shown in Table 6.

To this end, according to the present invention, in an electronic apparatus performing various calculations based on input data which are entered by pressing numeral keys and calculation keys and outputting results by moving a decimal point by a predetermined digit, there is provided means for judging, when a calculation result output key is operated, the presence or absence of a flag designating either a division calculation or a multiplication calculation and judging the calculation status. Only when the calculation condition at the time when the calculation result output key is operated is at a first registration number state and the division flag is set, the calculation result is outputted by moving the decimal point by a predetermined digit. If the multiplication flag is set, the calculation result is output without moving the decimal point.

Figure 2B:
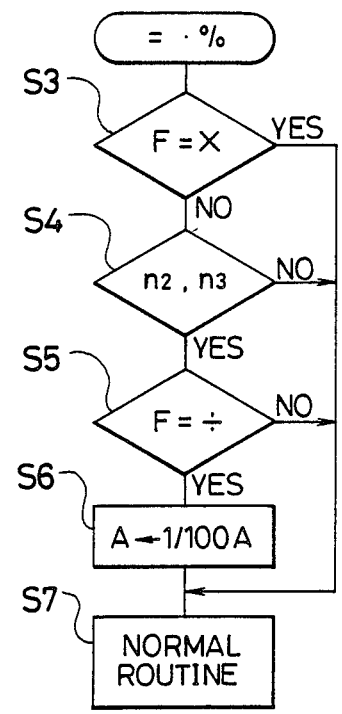

A designation key TS on a keyboard KB shown in FIG. 1 is a key for designating the amount of decimal point shift in the add-mode. If, for example, two digit shift is designated with the designation key, then in an ordinary calculation a registration number A is divided by 100, i.e., a decimal point is shifted by two digits, and thereafter a normal routine is executed as shown in FIG. 2(A). In the normal routine, the second registration number and the operation mode are stored and thereafter, if a first registration number and "=" are entered, then the calculation as shown in FIG. 2(B) is performed. In particular, a normal routine is executed at step S7, when "x" operation flag is set at step S3, when a second registration number is entered and an operation mode is entered at step S4, and when the operation flag is not set with a division operation at step S5. Alternatively, when a second registration number is entered and a division operation is designated, then at step S6 the first registration number is divided by 100, i.e., shifted by two digits and thereafter, at step S7 a normal calculation and output processes are performed. The outputs are indicated on a display DSP and a recorder P as shown in FIG. 3. For example, in performing an identical number multiplication calculation in the add-mode, first the operation "123×4=" at procedures T4 to T7 is performed and thereafter, at procedure T8 the operation for "5" and "=" is performed. In this case the calculation "1.23×5" is performed without a decimal point shift to accordingly display end record "6.15". In case of division calculation, first the operation "123÷2", is performed at procedures T9 and T10 to store "÷2". Then at procedure T11 keys for "234=" are pressed to perform a calculation of "2.34÷2" to display and record "1.17". As above, in case of an identical number division calculation, only the second registration number and the calculation mode are stored so that a division calculation can be performed by moving the decimal point of the first registration number. Therefore, an identical number division calculation is possible in the add-mode.

Embodiment

The present invention will now be described in detail in connection with the embodiment shown in the drawings. An electronic calculator installed with a printer is used as an example of the electronic apparatus of the present invention.

FIG. 1 is a block diagram showing an electronic calculator capable of outputting and recording calculation results on a recorder. In the figure, a keyboard KB is constructed of ten numeral keys NK, calculation keys CK, function keys KF including a clear key and the like, a memory key MK for clearing or reading memories, a print key for turning on or off record outputs, and a switch TS for designating the amount of decimal point shift in the add-mode. The keyboard KB is electrically connected to a contoller L constructed of a one-chip LSI or the like.

The controller L has ROM1 and RAM 2, the former storing programs for executing various calculations based on the inputs from the keyboard KB and the latter storing numerals and calculation resuts. A calculation unit U performs a calculation in accordance with the programs stored in ROM1. The calculation result is displayed on a display DSP constructed of liquid crystals or the like, or upon operation of the print key PK on the keyboard KB. The calculation result is also recorded on a recorder P via a recorder controller PC and a recorder driver PD. The recorder P may be a printer using a character drum or a bubble jet printer.

The operation of the electronic calculator constructed as above will be described. First, in the normal operation, the calculation unit U outputs a key scanning signal to the keyboard KB to detect any key input from the keyboard KB. A key input is discriminated by the calculation unit U which in turn performs calculations in accordance with input data by using calculation registers AR, BR, MR and the like of RAM2. Division, subtraction, multiplication and division calculations are respectively discriminated by the content of flag F within RAM2.

FIGS. 2(A) and 2(B) show a part of programs for the calculation unit U stored in ROM1 in the form of micro instructions.

In case where an add-mode is designated by the designation switch TS for designating the amount of decimal point shift, the processes shown in FIG. 2(A) are performed. In the processes, the amount of decimal shift is set at two digits by the designation switch TS, for calculation of the amount of money including dollars and cents.

In the ordinary calculation mode, excepting the identical number calculation, where the whole calculation is manually input, a number input at step S1 of FIG. 2(A) is divided by 100 to effect a two digit decimal shift. Succeedingly at step S2, calculation and output operations are performed using the decimal point shifted number. In case of addition and subtraction calculations, as described previously with respect to the prior art, both first and second registration numbers are shifted in their decimal points immediately after they are input, and at step S2 they are subject to calculation and output operations. In case of multiplication and division calculations, as similarly described previously with respect to the prior art, only the first registration number is shifted in its decimal point, and at step S2 calculation and output operations are performed. Specifically, key inputs of "123+456=" result in a calculation of "1.23+4.56" and an output of "5.79" on one hand, while on the other hand key inputs of "123×5" result in a calculation of "1.23×5" and an output of "6.15".

In case where one of the first and second registration numbers and a calculation result output key such as "=", "%" or the like are depressed, the processes shown in FIG. 2(B) are performed. At step S3 of FIG. 2(B) it is judged if the calculation content stored in the calculation designation flag F is a multiplication calculation or not. In case of an identical number multiplication calculation, an inputted second registration number is multiplied, in the similar manner as of the normal identical number calculation at step S7 without shifting the decimal point of the second registration number, by the first registration number stored together with the calculation mode.

If the calculation mode at step S3 is not a multiplication mode, then step S4 follows, $n_2$ and $n_3$ at step S4 indicate the calculation conditions of the calculation unit U. The calculation conditions of common electronic calculators include four conditions $n_0$, $n_1$, $n_2$ and $n_3$. T1 in general, $n_0$ represents the clear state and calculation result display state, $n_1$ represents the first registration number state, $n_2$ represents the calculation mode designation state, and $n_3$ represents the second registration number state. At step S4, it is judged if the calculation mode and the second registration number are stored or not. If negative at step S4, a normal routine is performed at step S7.

If the decision at step S4 is affirmative, then at step S5 it is judged by checking the calculation designation flag F if the calculation mode is a division calculation. If a division calculation is designated at step S5, step S6 follows to consider the input number as the first registration number and divide it by 100 to shift the decimal point by two digits. Thereafter, at step S7 an identical number division calculation is performed by dividing the first registration number by the stored second registration number.

As described above, even in the identical number division calculation storing the second registration number, an add-mode calculation automatically shifting the decimal points is possible.

In FIG. 3, examples of identical number calculations in the add-mode are shown with respect to their key operations, displays and records.

At procedures T1 to T3, key inputs "123+" are given and the first registration number is cleared. The corresponding displays and records are also shown. In this example, a two digit decimal point shift is designated by the designation switch TS. Therefore, when an addition mode is designated at procedure T2, the first registration number is divided by 100 and the number with its decimal point shifted by two digits is displayed and recorded on the display DSP the recorder P.

At procedures T4 to T7, a calculation "123×4" is performed. When "x" is inputted, the first registration number "123" is automatically shifted in its decimal point by two digits. The second registration number "4" is directly input as "4" without shifting the decimal point. As a result, at the input of "=", a calculation of "1.23×4" is performed and "4.92" is displayed and recorded.

Key inputs "5=" as shown at procedure T8 just after the multiplication calculation, an input number is used as the second registration number to perform a calculation of "1.23×5" and display and record the result "6.15". Procedure S8 follows the processes at steps S3 and S7 of FIG. 2(B).

At procedures T9 to T10, an ordinary division calculation in the add-mode is performed. In particular, upon depression of key "=" after key inputs "123÷2", the decimal point of the first registration number "123" is shifted by two digits and displayed as "1.23". The second registration number "2" is used for calculation without a decimal point shift. As a result, a calculation of "1.23÷2" is performed to display and record the result "0.62".

As seen from procedure T11, with key inputs "234" and "=" after the division calculation, the number "234" is used as the first registration number. In this case, the processes at steps S3, S4, S5 and S6 of FIG. 2(B) are performed to shift the decimal point of the first registration number "234" by two digits and perform a calculation of "2.34÷2". As a result, 1.17 is displayed and recorded on the display DSP and the recorder P.

The add-mode which shifts decimal points by two digits has been used in the above embodiment. However, it is obvious that the number of shifting digits is not limited to two.

As apparent from the foregoing description of the present invention, in an electronic apparatus outputting the calculated result by shifting the decimal point by a predetermined digit, there is provided means for judging, when a calculation result output key is operated, the presents or absence of a flag designating either a division calculation or a multiplication calculation and judging the calculation mode. Only when the calculation condition at the time when the calculation result output key is operated is at a first registration number state and the division flag is set, the calculation result is output by moving the decimal point by a predetermined digit. If the multiplication flag is set, the calculation result is output without moving the decimal point. Therefore, it is possible to provide an electronic calculator, without modifying a conventional apparatus to a large extent, capable of performing an identical number calculation for addition, subtraction, multiplication and division even in the add-mode automatically shifting decimal points.

What I claim is:

1. An electronic apparatus comprising:
   first input means for inputting at least first and second registration numbers;
   second input means for shifting a decimal point of said first registration number input by said first input means by a predetermined digit;
   calculation means for performing a division calculation between said first registration number shifted by said predetermined digit and input via said first and second input means, and said second registration number input from said first input means;
   output means for outputting a calculation result of said calculation means; and
   memory means for storing said second registration number input from said first input means;
   wherein, after said calculation result is output from said output means and another first registration number has been input by said first input means, said calculation means performs a division calculation between said another first registration number shifted by said predetermined digit, and said second registration number stored in said memory means.

2. An electronic apparatus according to claim 1, wherein said calculation means divides said another first registration number shifted by said predetermined digit by said second registration number.

3. An electronic apparatus according to claim 2, wherein said output means includes a display.

4. An electronic apparatus according to claim 2, wherein said output means includes a recorder.

5. An electronic apparatus according to claim 1, wherein said output means includes a recorder.

6. An electronic apparatus according to claim 1, wherein said output means includes a display.

7. An electronic apparatus comprising:
   first input means for inputting at least first and second registration numbers;
   second input means for shifting a decimal point of said first registration number input by said first input means by a predetermined digit;

calculation means for performing an arithmetic operation on said first registration number shifted by said predetermined digit and input via said first and second input means, and said second registration number input from said first input means, said arithmetic operation including at least one of multiplication and division;

memory means for storing said first registration number shifted by said predetermined digit and input via said first and second input means when said arithmetic operation is multiplication, and for storing said second registration number input from said first input means when said arithmetic operation is division; and output means for outputting a calculation result of said calculation means;

wherein, after said calculation result is output from said output means and another registration number has been input by said first input means, said calculation means performs said arithmetic operation between said another registration number shifted by said predetermined digit and said second registration number stored in said memory means when said arithmetic operation performed by said calculation means is division, and said calculation means performs said arithmetic operation between said another registration number and said first registration number shifted by said predetermined digit and stored in said memory means when said arithmetic operation performed by said calculation means is multiplication.

8. An electronic apparatus according to claim 5, wherein said output means includes a recorder.

9. An electronic apparatus according to claim 7, wherein when said calculation means performs division, said another registration number shifted by said predetermined digit is divided by said second registration number.

10. An electronic apparatus according to claim 6, wherein said output means includes a recorder.

11. An electronic apparatus according to claim 6, wherein said output means includes a display.

12. An electronic apparatus according to claim 7, wherein when said calculation means performs multiplication, said first registration number shifted by said predetermined digit is multiplied by said another registration number.

13. An electronic apparatus according to claim 7, wherein said output means includes a display.

14. An electronic apparatus according to claim 7, wherein said output means includes a recorder.

15. An electronic apparatus according to claim 5, wherein said output means includes a display.

* * * * *

UNITED STATES PATENT AND TRADEMARK OFFICE
CERTIFICATE OF CORRECTION

PATENT NO. : 4,779,219
DATED : October 18, 1988
INVENTOR(S) : YUJI URAMOTO

Page 1 of 2

It is certified that error appears in the above-identified patent and that said Letters Patent is hereby corrected as shown below:

COLUMN 1

Line 53, "it" should read --is--.
    Line 61, "term" should read --terms--.
    Line 62, "sun" should read --sum--.

COLUMN 3

Line 61, "outputs Nos. 5" should read --outputs as shown at Nos. 5--.

COLUMN 4

Line 52, "it," should read --is,--.

COLUMN 5

Line 38, "end" should read --and--.

COLUMN 6

Line 4, "resuts." should read --results.--.
    Line 20, "Division," should read --Addition,--.

COLUMN 7

Line 6, "T1 in" should read --In--.

COLUMN 8

Line 12, "presents" should read presence--.

UNITED STATES PATENT AND TRADEMARK OFFICE
CERTIFICATE OF CORRECTION

PATENT NO. : 4,779,219

DATED : October 18, 1988

INVENTOR(S) : YUJI URAMOTO

Page 2 of 2

It is certified that error appears in the above-identified patent and that said Letters Patent is hereby corrected as shown below:

COLUMN 10

```
Line  5, "claim 5," should read --claim 7,--.
Line 12, "claim 6," should read --claim 9,--.
Line 14, "claim 6," should read --claim 9,--.
Line 21, "claim 7," should read --claim 12,--.
Line 23, "claim 7," should read --claim 12,--.
Line 25, "claim 5," should read --claim 7,--.
```

Signed and Sealed this

Fourth Day of July, 1989

Attest:

DONALD J. QUIGG

Attesting Officer

Commissioner of Patents and Trademarks